United States Patent [19]

Games et al.

[11] 4,212,078
[45] Jul. 8, 1980

[54] COMPUTER CONTROLLED FACILITY MANAGEMENT SYSTEM (FMS)

[75] Inventors: John E. Games, Granby; Richard E. Rosien, Windsor; William W. Bitterli, Simsbury, all of Conn.

[73] Assignee: United Technologies Corporation, Hartford, Conn.

[21] Appl. No.: 864,557

[22] Filed: Dec. 27, 1977

[51] Int. Cl.[2] .................. G06F 3/04; G06F 15/46; H04Q 9/00
[52] U.S. Cl. ...................... 364/900; 165/22
[58] Field of Search ... 364/200 MS File, 900 MS File, 364/114, 118; 236/1 B, 1 C; 165/13, 14, 22, 27, 28

[56] References Cited

U.S. PATENT DOCUMENTS

| | | | |
|---|---|---|---|
| 3,400,374 | 9/1968 | Schumann | 364/108 X |
| 3,522,588 | 8/1970 | Clarke, Jr. et al. | 340/147 R |
| 3,622,994 | 11/1971 | Schoenwitz | 340/151 X |
| 3,633,169 | 1/1972 | Bickford | 364/200 |
| 3,633,169 | 1/1972 | Bickford | 364/200 |
| 3,636,331 | 1/1972 | Amrehn | 364/200 X |
| 3,648,252 | 3/1972 | Thron et al. | 364/200 |
| 3,697,953 | 10/1972 | Schoenwitz | 340/163 |
| 3,716,096 | 2/1973 | Berrett et al. | 165/22 |
| 3,716,096 | 2/1973 | Berrett et al. | 165/22 |
| 4,090,248 | 5/1978 | Swanson et al. | 364/900 |
| 4,090,248 | 5/1978 | Swanson et al. | 364/900 |

Primary Examiner—Mark E. Nusbaum
Assistant Examiner—Thomas M. Heckler
Attorney, Agent, or Firm—Dominic J. Chiantera

[57] ABSTRACT

A central control system includes a central processing unit (CPU) installed in a central location of a facility, and interconnected with a plurality of remote controllers, each located in an associated one of several buildings in the facility and each including a remote microprocessor (RMP), the CPU automatically controlling, simultaneously from the central location, the closed loop operation of individual environmental conditioning systems in the several buildings comprising the facility in combination with the RMP associated therewith and in dependence on the sensed temperature conditions within the living spaces associated with each system. The CPU includes a keyboard responsive to operator control for receiving selected parameter reference values provided by the operator at the central location, the reference values establishing the closed loop gains and reference temperatures for the individual environmental systems, the reference values being instantaneously changeable by the operator in one, or all of the environmental systems to accommodate changes in operating conditions. The central control including two CPUs, each fully capable of providing automatic control of the facility environmental conditioning systems in combination with the RMPs, the system further including redundant interconnecting lines between each CPU and the plurality of RMPs, each line including a liner receiver for each RMP, to provide the simultaneous control of the closed loop operation of the individual environmental conditioning systems in each of the buildings in such a manner as to provide fail-safe control of each from the centralized location.

4 Claims, 7 Drawing Figures

COMPUTER CONTROLLED FACILITY MANAGEMENT SYSTEM (FMS)

CROSS REFERENCE TO RELATED APPLICATIONS

Portions of the subject matter hereof are also disclosed in one or more of the following, commonly owned, copending applications entitled ENERGY CONSERVATIVE CONTROL OF HEATING, VENTILATING, AND AIR CONDITIONING (HVAC) SYSTEMS, Ser. No. 829,379, filed on Aug. 31, 1977 by John E. Games et al, ENERGY CONSERVATIVE CONTROL OF TERMINAL REHEAT HEATING, VENTILATING, AND AIR CONDITIONING (HVAC) SYSTEMS, Ser. No. 836,118, filed on Sept. 23, 1977 by William W. Bitterli et al, TEMPERATURE CONTROL OF CHILL WATER AND STEAM IN HEATING, VENTILATION, AIR CONDITIONING (HVAC) SYSTEMS, Ser. No. 845,110, filed on Oct. 25, 1977 by David M. Healey et al, TEMPERATURE CONTROL OF UNOCCUPIED LIVING SPACES, Ser. No. 860,026 filed on Dec. 12, 1977 by John E. Games et al, and POWER DEMAND LIMIT IN HEATING, VENTILATING, AND AIR CONDITIONING (HVAC) SYSTEMS, Ser. No. 864,558 filed on even date herewith by John E. Games et al.

BACKGROUND OF THE INVENTION

1. Field of the Invention

This invention relates to control apparatus for environmental conditioning systems, and more particularly to simultaneous, central supervisory control of the closed loop operation of individual environmental conditioning systems located in each of several buildings comprising a facility.

2. Description of the Prior Art

As known, HVAC systems are used for controlling the environmental temperature conditions in one or more living spaces within a building enclosure. The HVAC systems include a number of well known types, such as dual duct, multi-zone, and terminal reheat type systems, each including separate sources of heating and cooling within the system.

Each HVAC system is controlled through sensed space temperature signals presented to a local sub-master, or site controller associated with the individual HVAC, the controller providing modulation of the discharge temperatures of the HVAC air handler source in dependence on the sensed temperature signals. The number of living spaces serviced by each HVAC is dependent on the heating and cooling capacity of the system, such that in multi-storied office buildings a number of HVACs may be used to service the living spaces on different floors, or groups of floors. Typically, each HVAC system in the building is controlled by its own controller, autonomously, in dependence on the desired space temperature set into a thermostat within the living space by the human occupant. In response to the need for energy conservation, a number of more recent central control systems have been developed to provide for more efficient control of the individual HVACs within the building. These building control systems typically include a central type of supervisory control over the operation of all of the HVACs within the building. These prior art supervisory controls provided reference temperature values to the HVAC site controls, which in turn regulate the associated HVAC operation through a simple closed loop proportional gain control. This simple proportional gain loop control of the HVAC results in the undesirable characteristics of droop error for too low a gain, and discharge temperature limit cycling within the hot and cold decks for too high a value of proportional gain, as described in the hereinbefore cross referenced application to Games et al (Ser. No. 829,379). Each condition results in energy wasting. In the most recent building supervisory control systems, the central control is provided through a geneal purpose digital computer, connected through transmission lines to the various HVAC systems within the building. One such system is disclosed in a patent to Percoraro et al, U.S. Pat. No. 3,896,871, wherein a computer controlled automated building system includes a central digital computer having programmed routines stored within the computer memory, and which communicates with a number of control points, stated as including environmental equipment, through interconnecting trunk lines and line receives associated with each control point. The computer includes an analog-to-digital (A/D) converter, and although the functional details of the control provided by the computer system of Percoraro over the various control points is not disclosed, it would appear that the computer control is limited to providing discrete analog signals, such as temperature reference signal limits to site controllers associated with the various environmental conditioning equipment, and to monitoring the systems for alarm, or failure conditions. This typifies the level of control known in the art at the present time, i.e. the use of discrete command signals to provide step changes in reference temperatures for "set-back conditions" during unoccupied periods, or for turn on and turn off of the equipment in response to sensed alarm conditions, time of day etc. These types of systems are not fully automated since operator control is required even for routine operation, such as providing a command into the computer requesting the set-back temperature references for nighttime operation. As such, the function of the computer controlled automated building system of Percoraro is that of a "stick control", i.e. allowing an operator in a central control station to provide discrete input control signals to remotely located equipment. The system of Percoraro is further stated as also being applicable for controlling environmental equipment in several buildings in a complex, however, once again the control being limited to discrete control signals.

The demand for operating efficiency, and the difficulty in achieving higher efficiency, is magnified where central control is desired over a number of different types of environmental conditioning systems, each installed in several different buildings located at some distance from each other in a common facility, such as a university campus. These systems may include combinations of HVACs of various types, perimeter heating systems, and thermal sources providing both chill water and steam. In such installations, the degree of control varies as does the type of environmental equipment being controlled. Similarly many systems interact with each other, such as a common chill water or common steam source providing inputs to some number of HVACs in a network servicing a single multi-storied building. In these circumstances it is desirable to control the operation of the HVACs in the network, jointly, in addition to controlling the thermal sources servicing the HVACs, in order that an overall optimization and energy savings may be achieved. This overall control is not possible in the prior art central supervisory systems which provide only discrete control command, i.e. the "stick control" type of system. Similarly, the control of the individual apparatus, i.e. the single HVAC system, perimeter heating system, or thermal source, offers the opportunity for a significant improvement in optimizing operation through the ability to change the control loop gains and reference values, instantly, in response to changes in operating conditions for the particular system. A central control which is capable of optimizing the total operation of interrelated environmental conditioning systems, or of changing the operational gain values of the individual systems, requires a hierarchical control system having the capability of providing direct inner control over the specific functions in each system, while having the capability of managing the overall operation of the entire plurality of conditioning systems in their interrelationship.

SUMMARY OF THE INVENTION

An object of the present invention is to provide apparatus for automatically controlling, simultaneously from a central location, the closed loop operation of individual environmental conditioning systems in a plurality of buildings comprising a facility, in dependence on the sensed temperature conditions within the living spaces associated with each system. Another object of the present invention is to provide apparatus for automatically controlling, simultaneously from a central location, the closed loop operation of individual environmental systems in each building of the facility in response to selected gain constant values and parameter reference values provided by an operator at the central location, which are instanteously changeable by the operator in one, or all of the environmental systems to accommodate changes in operating conditions. A still further object of the present invention is to provide apparatus for automatically controlling, simultaneously from a central location, the closed loop operation of individual environmental conditioning systems in each of the buildings in a facility in such a manner as to provide fail-safe control of each from the centralized location.

According to the present invention, the apparatus includes: sensors installed in each of the environmental conditioning systems (ECS) for providing sensed data signals representative of actual parameter values for the controlled devices in each system, control interface apparatus similarly disposed in each ECS and responsive for providing parameter control signals to each controlled device in an associated ECS in response to closed loop control signals presented at an input thereof, remote microprocessors (RMP), one each associated with one or more ECSs within a common building enclosure, each having memory means for storing signals including proportional gain signals and each having means for successively sampling periodically, and registering in the memory, successively sampled values of the sensed data signals, the RMP comparing successively sampled values of the sensed data signals with a related one of a plurality of controlled device reference parameter signals presented thereto for providing the closed loop control signals in response to a difference value therebetween, and a central processing unit (CPU), providing an actual time of day signal, the apparatus further including having a main memory for storing signals including ECS reference signals, the CPU being responsive to the sensed data signals stored in the RMP memory for comparing the sensed data signals with the ECS reference signals for providing the controlled device reference parameter signals in response thereto. In further accord with the present invention, the apparatus further includes keyboard apparatus responsive to operator control for providing signals representative of the ECS reference signals to the CPU in response to selective operation thereof, and wherein the CPU further includes means for registering the ECS reference signals in the main memory.

The control apparatus of the present invention provides total operational control of the environmental conditioning systems within a facility, which may be located in several different buildings, each at some distance from each other and from a central control location. The system includes a central CPU in combination with a RMP associated with each of the groups of environmental conditioning systems to be controlled, thereby providing a hierarchal control function.

These and other objects, features and advantages of the present invention will become more apparent in the light of the following description of a detailed embodiment thereof, as illustrated in the accompanying drawing.

DETAILED DESCRIPTION

Figure 1:
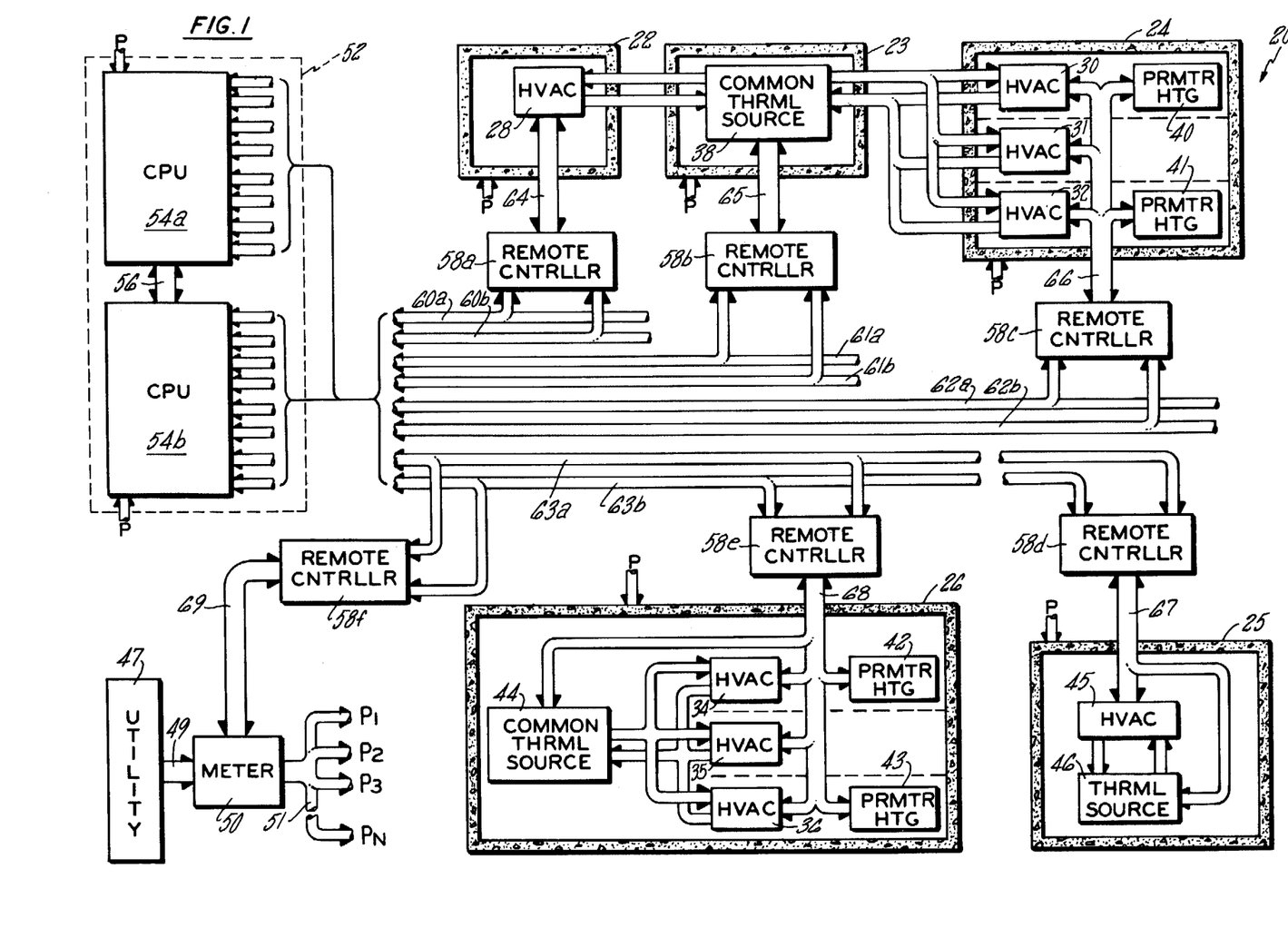
FIG. 1 is a schematic block diagram of a central supervisory control system for a facility, according to the present invention.

Referring now to FIG. 1, in a preferred embodiment of a supervisory control system according to the present invention, a facility 20 includes a plurality of buildings 22-26, or enclosures, each having living spaces in which the ambient temperature is regulated through the use of known HVAC type systems, supplemented in certain buildings by perimeter heating systems. The buildings are located at some distance from each other, and from a central control location in the facility. The facility layout may be representative of a university campus wherein a large number of buildings comprise the campus, each at significant distances from each other. Certain buildings are shown as having only a single HVAC, such as the building 22 including the HVAC 28, whereas the buildings 24, 25 represent larger buildings having multiple floors or zones which require a multiple number of HVACs, such as the HVACs 30-32 in the building 24, and the HVACs 34-36 in the building 25. The building 23 is illustrated as not including an HVAC system i.e. no living spaces, but rather represents a utility type structure enclosing a common thermal source 38 which provides chill water and steam or hot water to the HVAC network comprised of HVACs 28, and 30-32. In addition, the buildings 24, 26 further include perimeter heating systems 40, 41 and 42, 43 respectively, which as may be known provide supplemental heating to that provided by the HVACs in those living spaces within the buildings which are located along the perimeter and therefore subject to more severe environmental conditions due to the "cold wall effect". The building 25 further illustrates the use of a common thermal source 44 included within the building to provide the chill water and steam to the HVACs 34-36 within the building. Finally, the building 26 further illustrates another combination of a single HVAC system 45 being serviced by a dedicated thermal source 46.

The illustration of the facility 20 in FIG. 1 is intended only to show the various combinations of environmental conditioning systems, i.e. single HVAC sysems, HVAC networks, and HVAC systems in combination with perimeter heating systems, which typifies the type of "patchwork" of environmental conditioning systems as may be found in a facility such as a university campus, or any other facility in which buildings have been added over a period of time, as required, without the benefit of planned growth, or common environmental conditioning systems. In addition the individual conditioning systems in each building vary as to manufacturer, age and type of system. Generally all of the present conditioning systems known in the prior art include pneumatic control systems which are considered reliable, but which limit the ability to control such systems from a distance or from a common central location due to the difficulty in establishing high integrity pneumatic control lines over any distance.

The facility 20 receives electrical power from an electrical utility 48 through a common input line 49 and a watt meter apparatus 50, which measures and records the total electrical power usage in kilowatt hours (KWH) of the utility. As may be appreciated, certain facilities may receive electrical power input at several locations, in which case a watt meter apparatus, such as the meter 50, would be installed at each location and the KWH reading of each would be summed to determine the total facility power usage.

In the supervisory control system of the present invention, a central controller 52 includes a pair of central processing units (CPU) 54$_a$, 54$_b$, each identical and each including a real time capability as described in detail hereinafter with respect to FIG. 3. The dual CPUs are interconnected to each other through a communication link provided by a trunk line 56 which allows transfer of digital signal information between each. Each CPU has identical stored programming and each receives identical input signal information, such that the two in combination provide complete redundancy of control capability within the central controller 52, i.e. either one is capable of providing full supervisory control functions at any one time. This redundancy of control capability is provided by connecting each to remote controllers 58$_a$-58$_f$ through trunk line pairs 60-63. Each of the trunk lines (a, b) within the trunk pairs 60-63 are dual triaxial cables, i.e. a coaxial cable with an outer shield to provide protection. Each remote controller is associated with one of the buildings 22-26 and with the meter 50, and each includes a remote microprocessor (RMP) of a type known in the art as described in detail hereinafter with respect to FIG. 2. Each remote controller is connected to each of the triaxial cables in an associated one of the four pairs of trunk lines as described in detail with respect to FIG. 2. The RMP receives and transmits signal information to the CPUs through either one of the triax cables within the pair in dependence on a selection provided by the CPU through discrete command signals. The redundant triaxial cables are each capable of interconnecting the CPUs to over 30 remote controllers, if required, and although FIG. 1 illustrates only the pair 63 as having more than a single remote controller, each of the dual triaxial pairs are capable of the 30 remote controller hookup. Similarly, each of the cables is capable of transmission over a maximum distance of up to ten thousand feet without the use of active or passive repeaters within the lines.

The remote controllers 58$_a$-58$_e$ are connected to the various environmental conditioning systems within the buildings 22-26 through trunk lines 64-68, which provide interconnection between the RMP within each remote controller and the controlled devices within the associated conditioning systems. The remote controller 58$_f$ is connected to the meter 50 through lines 69. The interface with each one of the respective HVAC, thermal source, and perimeter heating type systems is disclosed in detail in one or more of the hereinbefore referenced copending applications, and is illustrated and described briefly herein with respect to FIGS. 4-7, to provide completeness in the present description of a supervisory control system according to the present invention.

Figure 4:
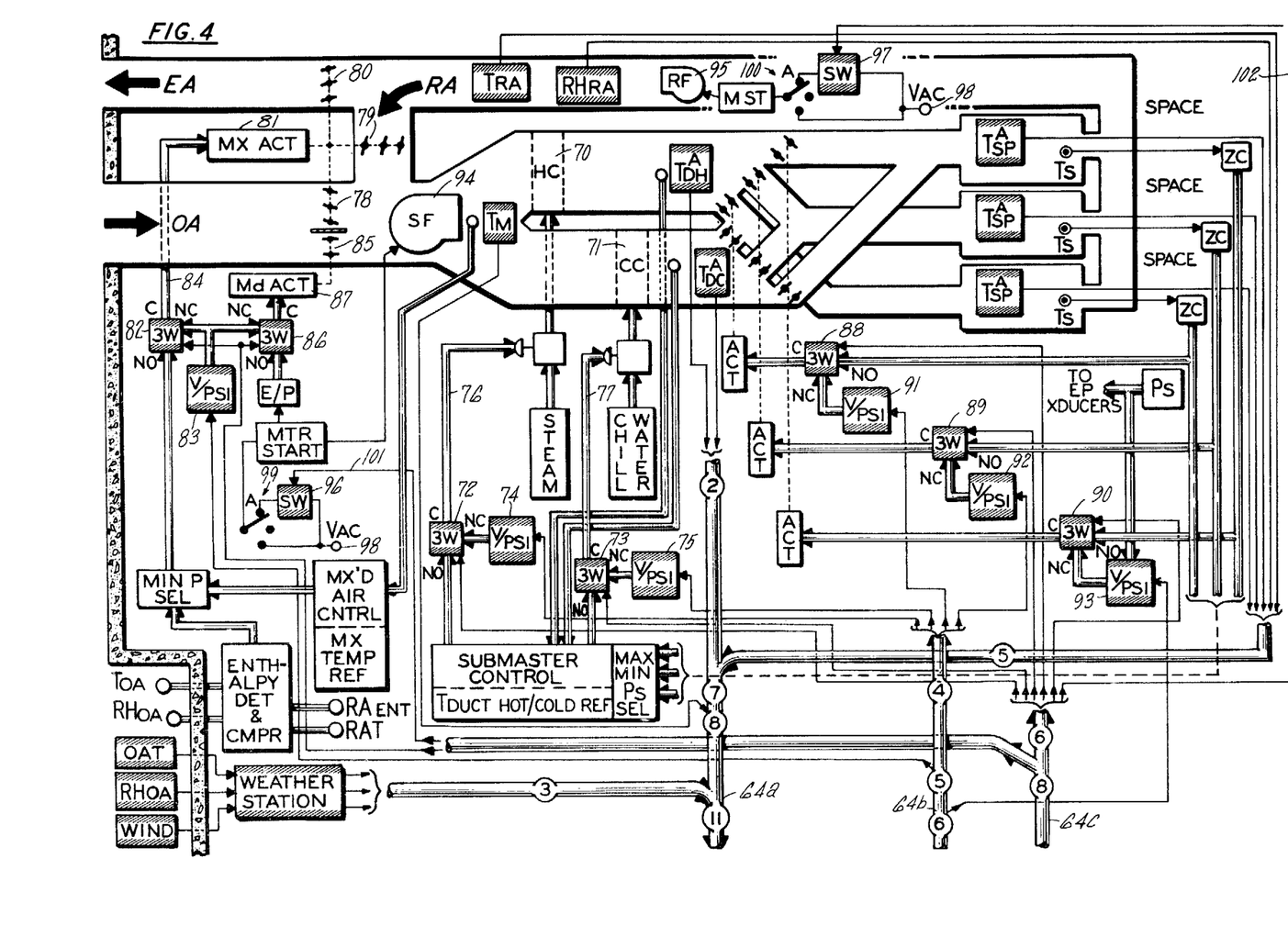
FIG. 4 is a simplified block diagram illustration of the interconnection of the control system of the present invention with an HVAC system.

The interface between a remote controller, such as the controller 58$_a$ and the HVAC system 28, is illustrated in FIG. 4. The HVAC system of FIG. 4 is assumed to be of the multi-zone type, well known in the art, and the detailed disclosure of the control functions over the HVAC operation provided in the hereinbefore cross referenced application to Games et al (Ser. No. 829,379) is expressly incorporated by reference into the present application. The control interface between the remote controller 58$_a$ and the HVAC 28 is provided by installing electropneumatic (EP) transducers in combination with three-way valves in the pneumatic control lines of the various HVAC system actuators and valves. The three-way valves are of a type known in the art, such as the Johnson Control Model V 24 and are selectably operable in one of two positions from a common (C) port to either a normally closed (NC) or a normally open (NO) port. Each valve is installed in the existing pneumatic control line in such a manner as to provide connection of the existing pneumatic line between the C and NO ports, and the NC port is connected to the pneumatic output line of the EP transducer. The instantaneous position of the valve is determined by the energizing of a solenoid within the valve assembly with a typical energizing voltage of 24 volts AC, which is presented to the solenoid in response to the presence of a discrete energizing gate signal from the RMP within the remote controller. In the presence of a discrete signal at the input of the three-way valve, a pneumatic pressure signal path is provided between the NC and C ports, i.e. the output of the EP transducer and the input to the controlled device. This provided for a "fail-safe" operation since a failure in the RMP provides restoration of the three-way valve pneumatic signal path to the C and NO ports thereby restoring control to the existing HVAC system. The EP transducers are similarly of a type known in the art, such as the Hammeldahl Model T15. The transducers are charged from the system pressure source ($P_S$) to provide an operating pneumatic pressure signal in a typical range of 0-20 psi in response to an analog voltage signal from the remote controller RMP within a determined input analog voltage range.

As shown in FIG. 4, the HVAC heating coil 70 and cooling coil 71 are controlled by installation of three-way valves 72, 73 and EP transducers 74, 75 in the heating and cooling coil pneumatic control line 76, 77. The HVAC mixed air dampers which include the outside air (OA) damper 78, the return air (RA) dampers 79, and the exit air (EA) dampers 80, which are position controlled by a pneumatic actuator 81, are controlled by the remote controller $58_a$ through installation of a three-way valve 82 and EP transducer 83 in the control line 84 of the actuator. Similarly, the minimum dampers 85 are position controlled by the remote controller through installation of a three-way valve 86 in the control line of the minimum damper actuator 87.

For a multi-zone type system, where there is practical access to the actuators controlling the living space hot air, and cold air dampers, three-way valves in combination with EP transducers are similarly installed to allow position control of the space dampers by the remote controller $58_a$, as shown in FIG. 4 through three-way valves 88-90 in combination with EP transducers 91-93. Each of the three-way valves is connected to the RMP within the remote controller through a discrete signal line which allows for the RMP energizing of the solenoid within the valve. Similarly, the EP transducers receive analog input signals from the RMP through an associated analog signal input line. The remote controller receives sensed signal parameters including the actual living space temperatures, outside air temperatures and hot and cold deck discharge temperature, in addition to outside air wind and relative humidity, the various sensors being illustrated in FIG. 4 and described in detail with respect to FIG. 1 of the Ser. No. 829,379 Games et al application.

Referring still to FIG. 4, further interface is provided between the remote controller $58_a$ and the HVAC supply fan 94 and return air fan (if included in the system) 95 through the use of voltage controlled switches 96, 97 respectively. The voltage controlled switches are selectably operable, and are of a type known in the art which provide electrical interconnection between a voltage source 98, and an automatic (A) contact on each of two manually operated switches 99, 100 associated with the supply fan 94 and return air fan 95, in response to discrete gate signal presented to a gate input of each on the lines 101, 102 from the remote controller $58_a$. The signals presented to the various three-way valves, EP transducers, and voltage controlled switches, in addition to the sensed signal parameters presented from the various temperature, wind, and relative humidity sensors, are presented to the remote controller through sub-trunk lines $64_a$–$64_c$, included within the trunk line 64 of FIG. 1.

Figure 5:
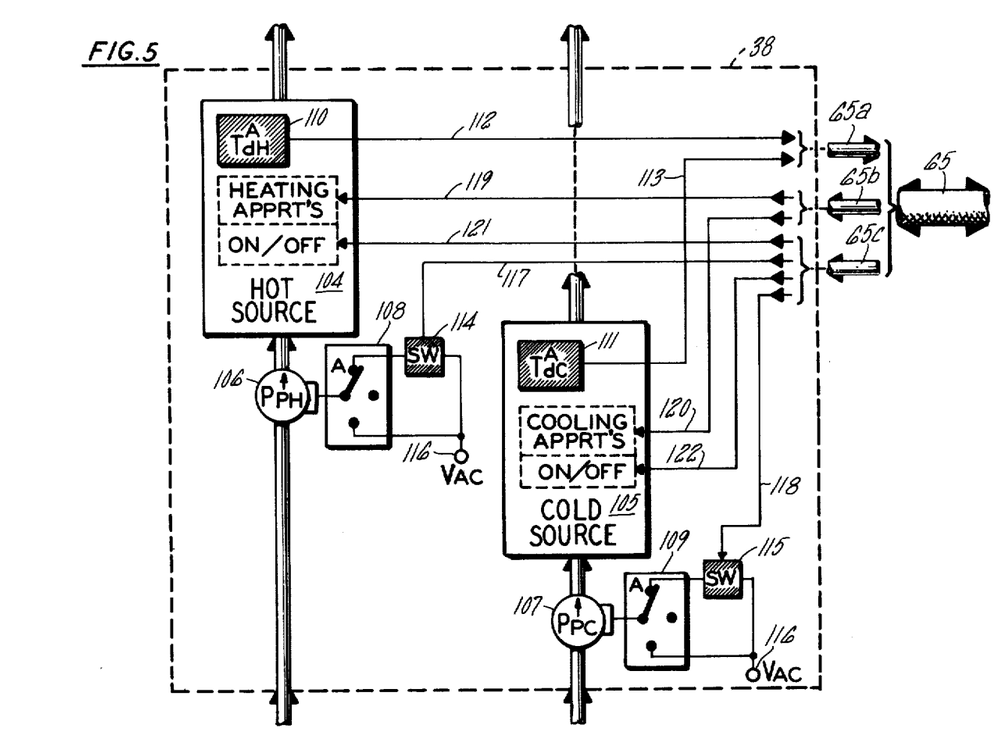
FIG. 5 is a simplified block diagram illustration of the interconnection of the control system of the present invention with a common thermal source.

The remote controller $58_b$ is interfaced with the common thermal source 38 in a manner illustrated schematically in FIG. 5, and described in detail in the hereinbefore referenced, copending application to Healey et al, and the detailed description provided in the healey et al application is expressly incorporated by reference in the present application. Referring now to FIG. 5, the common thermal source 38 includes a hot source 104 and cold source 105, each having associated primary pumps 106, 107. The pumps ae energized through manually operable switch assemblies 108, 109 which allows selectable operation of the pumps, i.e. shutdown of the pumps for repair, maintenance, or seasonal shutdown. The interface apparatus includes installation of temperature sensors 110, 111 in the hot source and cold source respectively, each providing an actual discharge temperature signal from the respective sources on lines 112, 113. Voltage controlled switches 114, 115 are interconnected between a source of AC voltage 116 and an automatic (A) contact on each of the manually operable switches 108, 109. The voltage controlled switches are identical to the switches 96, 97 described in FIG. 4, and provide electrical connection of the source to the A contact in response to discrete gate signals presented, to gate inputs thereof, through lines 117, 118 included in the trunk line 65 from the remote controller $58_b$. As described in the referenced application to Healey et al, the interface between the remote controller $58_b$ and each of the hot and cold sources is dependent on the particular type of hot and cold source included in the system, i.e. the hot source may use any number of known methods of heating hot water to the desired discharge temperature, such as steam heating or through the use of electrical or fossil fuel fired heaters, and the cold source may be a chiller of any one of a number of basic types, such as a steam absorption type, an electrical centrifugal chiller, or an electrical reciprocating chiller, with the control and sensing apparatus differing with each. In all cases, the heating and cooling apparatus used in the hot and cold sources are of a type well known in the art, such that the final interface may be provided through well known techniques and with apparatus known in the art. The illustration of FIG. 5 represents only a generic, or block diagram illustration of the interface, which includes both linear control of the apparatus operation provided through analog signal inputs presented from the remote controller $58_b$ on lines 119, 120, and discrete on/off signals provided on lines 121, 122.

The common thermal source 38 provides both hot and cold fluid medium, such as chill water and hot water to each of the HVAC systems 28, and 30-32 which in combination comprise an HVAC network. FIG. 5 is included herein only to illustrate the interface connections between the remote controller $58_b$ and the common thermal source 38, as part of an overall central supervisory control system.

Figure 6:
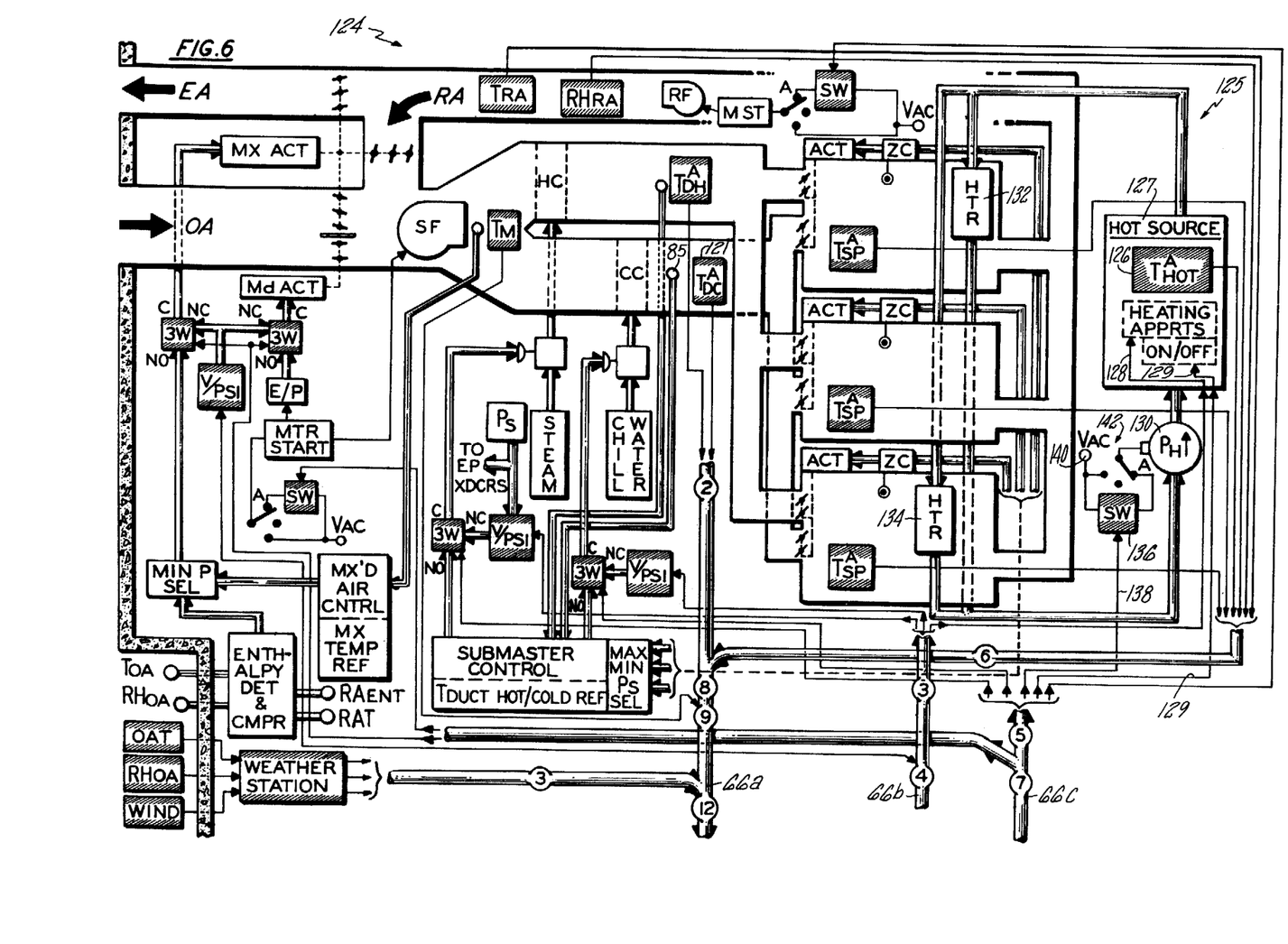
FIG. 6 is a simplified block diagram illustration of the interconnection of the control system of the present invention with a combination HVAC and parameter heating system.

Referring again to FIG. 1, the buildings 24, 26 each include some number of HVAC systems which are used in combination with perimeter heating systems in the perimeter living spaces in each building. The remote controllers $58_c$, $58_e$ are interfaced with each of the HVAC and perimeter heating systems included in the associated buildings. The hereinbefore referenced, copending application to Games et al Ser. No. 860,026 discloses in detail the interface connection between the RMP included within the associated remote controller, and the combined HVAC and perimeter heating system servicing those perimeter living spaces in the building, and the detailed disclosure included therein is expressly incorporated by reference into the present application. Referring now to FIG. 6, in an illustration of a dual-duct type of HVAC system 124 together with a perimeter heating system 125, the interface with the dual-duct HVAC is identical to that described hereinbefore with respect to FIG. 4, with the exception that no interface apparatus is provided to control the position of the space dampers, since in a dual-duct type of system the dampers are located within the individual spaces rather than in close proximity to the heating and cooling apparatus, such that control over the space damper position is impractical. Control interface with the perimeter heating (PH) system 125 includes the addition of a discharge temperature sensor 126 in the hot source 127 of the PH system, which provides an actual hot water discharge temperature signal. The interface apparatus for controlling the modulation of the discharge temperature from the hot source is again dependent on the type of hot source included, as described hereinbefore with respect to the common thermal source 38 of FIG. 5. As such, the interface is of a generic type which simply shows the interconnecting lines from the RMP within the remote controller, and includes an analog signal line 128 for modulating the heating apparatus output and a discrete line 129 for controlling the on/off status of the heating apparatus. As described in the Games et al application, the PH system pump 130 forces the hot water from the source 127 through the network of perimeter space heaters 132, 134, and is interfaced with the RMP through a voltage controlled switch 136, identical to the voltage controlled switches described hereinbefore with respect to FIGS. 4, 5, which respond to discrete gate signals presented at a gate input thereof from the RMP on a line 138, to provide electrical interconnection between a source of AC voltage 140 and an automatic (A) contact on a manually operable switch 142, to provide actuation of the pump 130.

Figure 7:
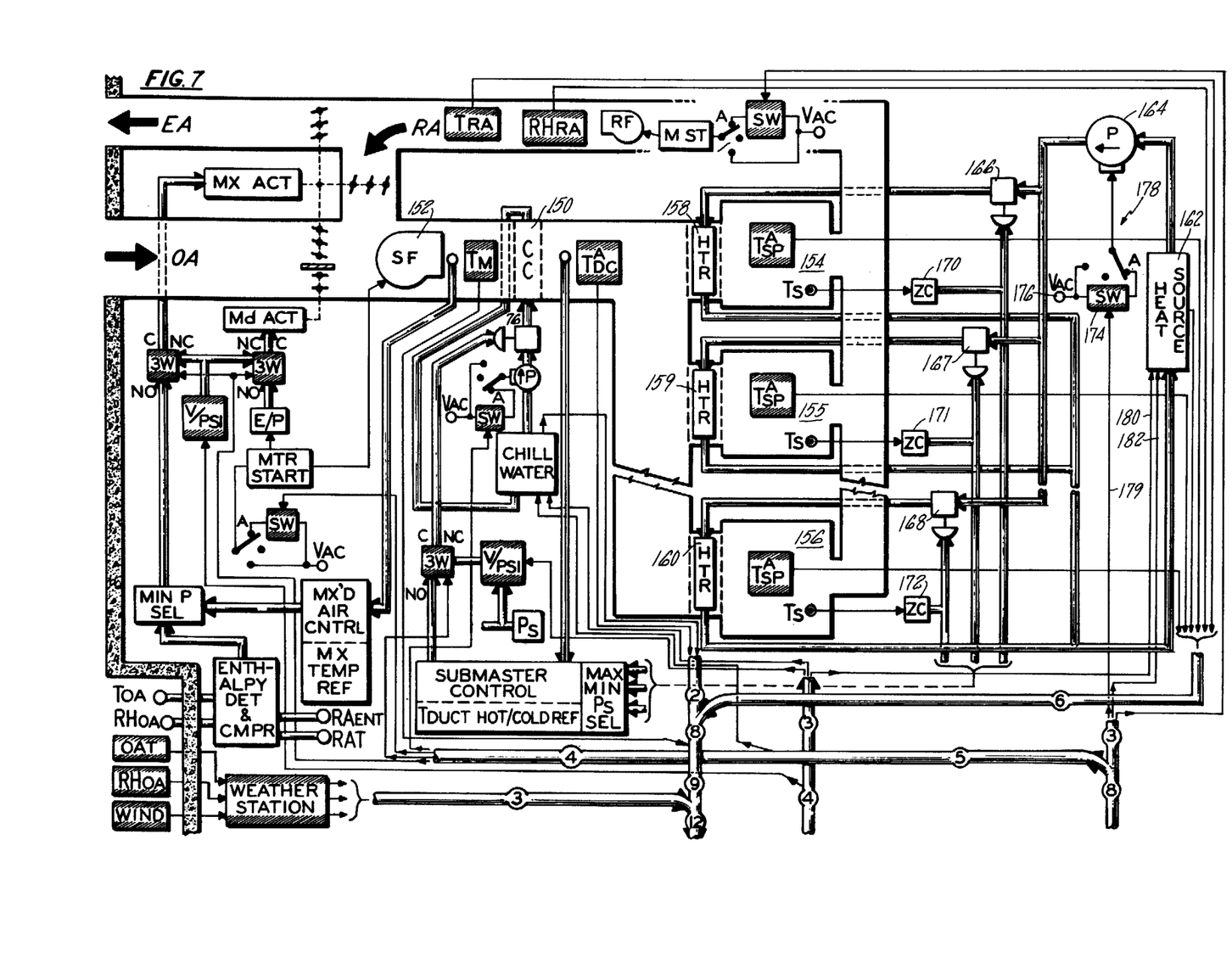
FIG. 7 is a simplified block diagram illustration of the interconnection of the control system of the present invention with a terminal reheat type of HVAC system.
Figure 8:
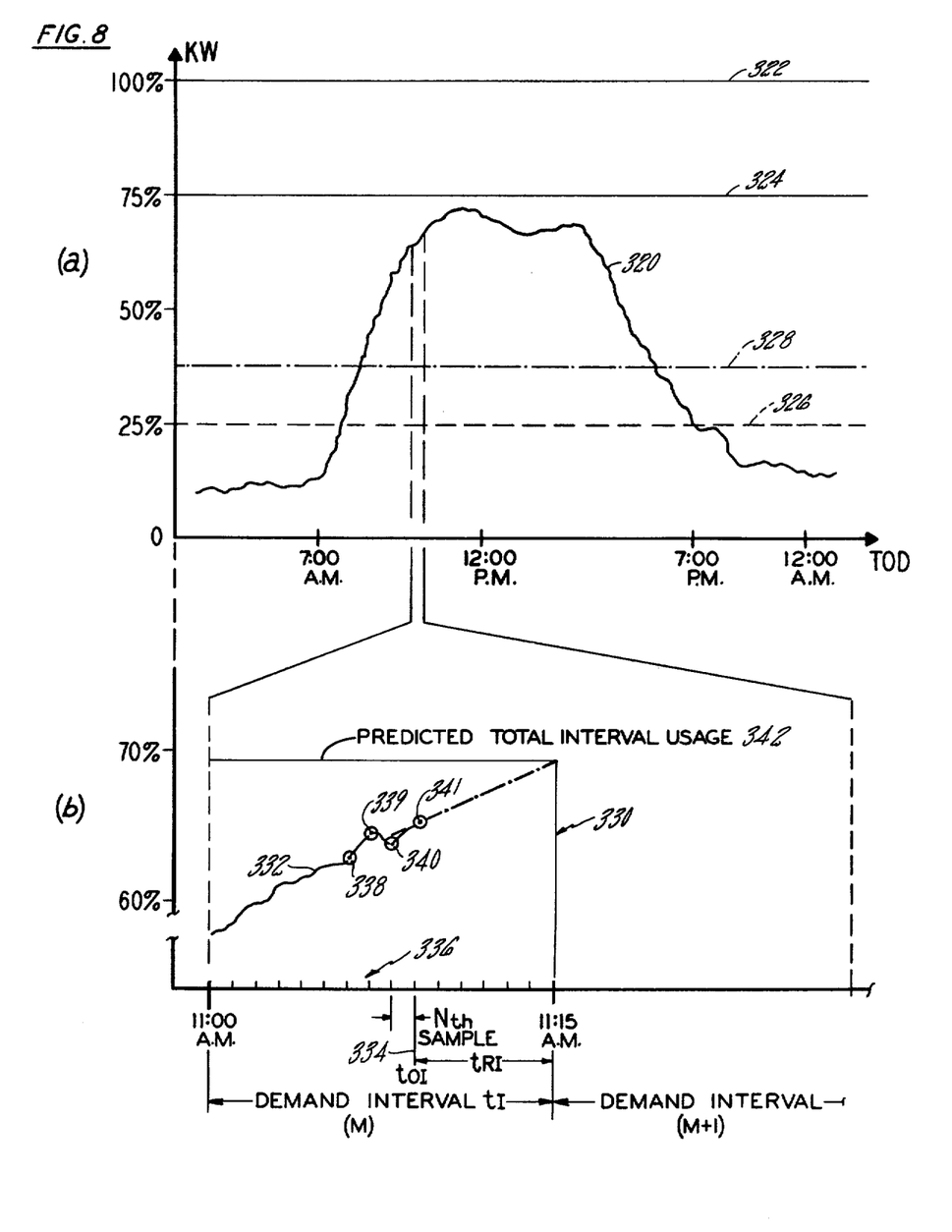
Figure 9A:
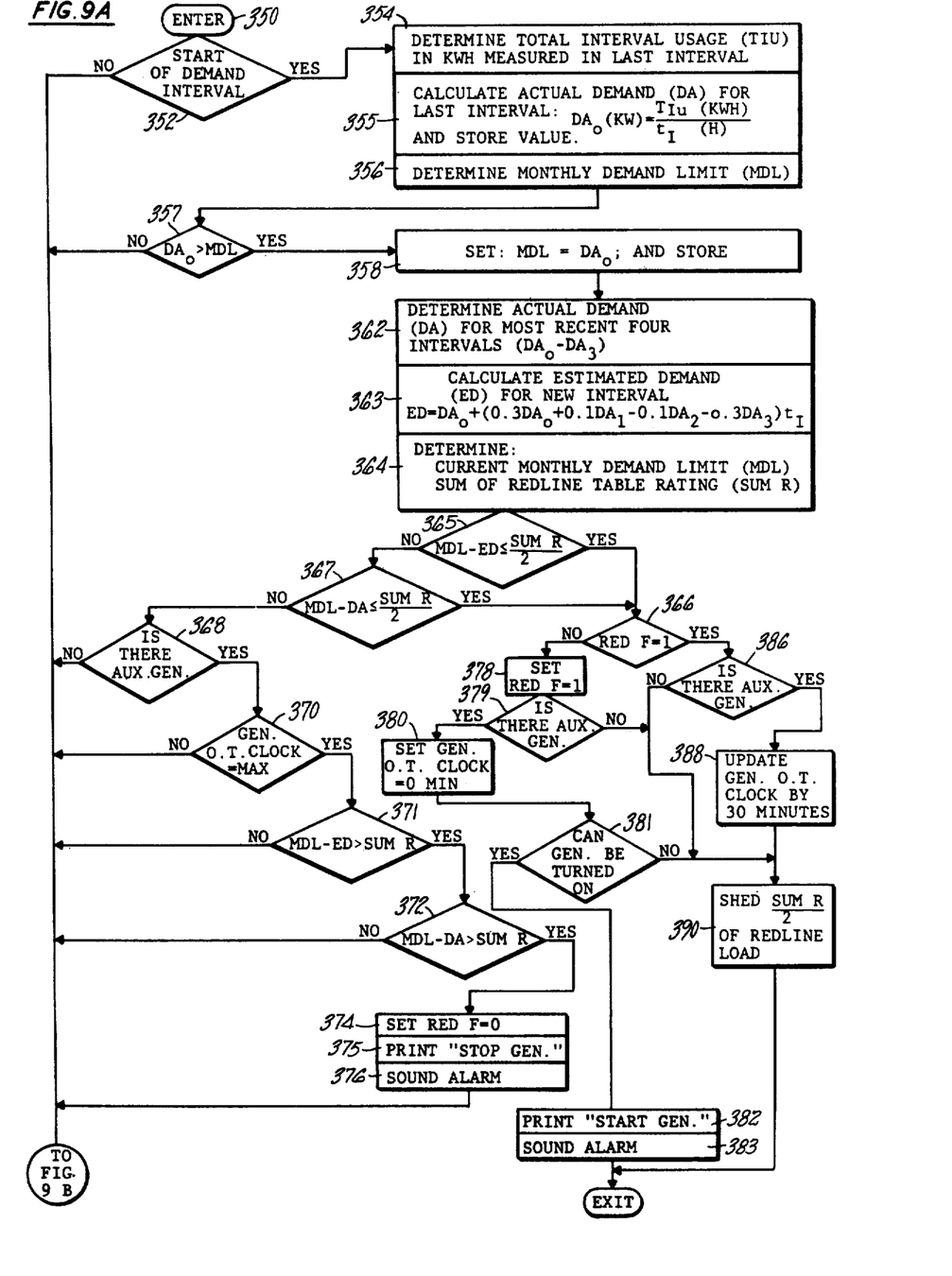
Figure 9B:
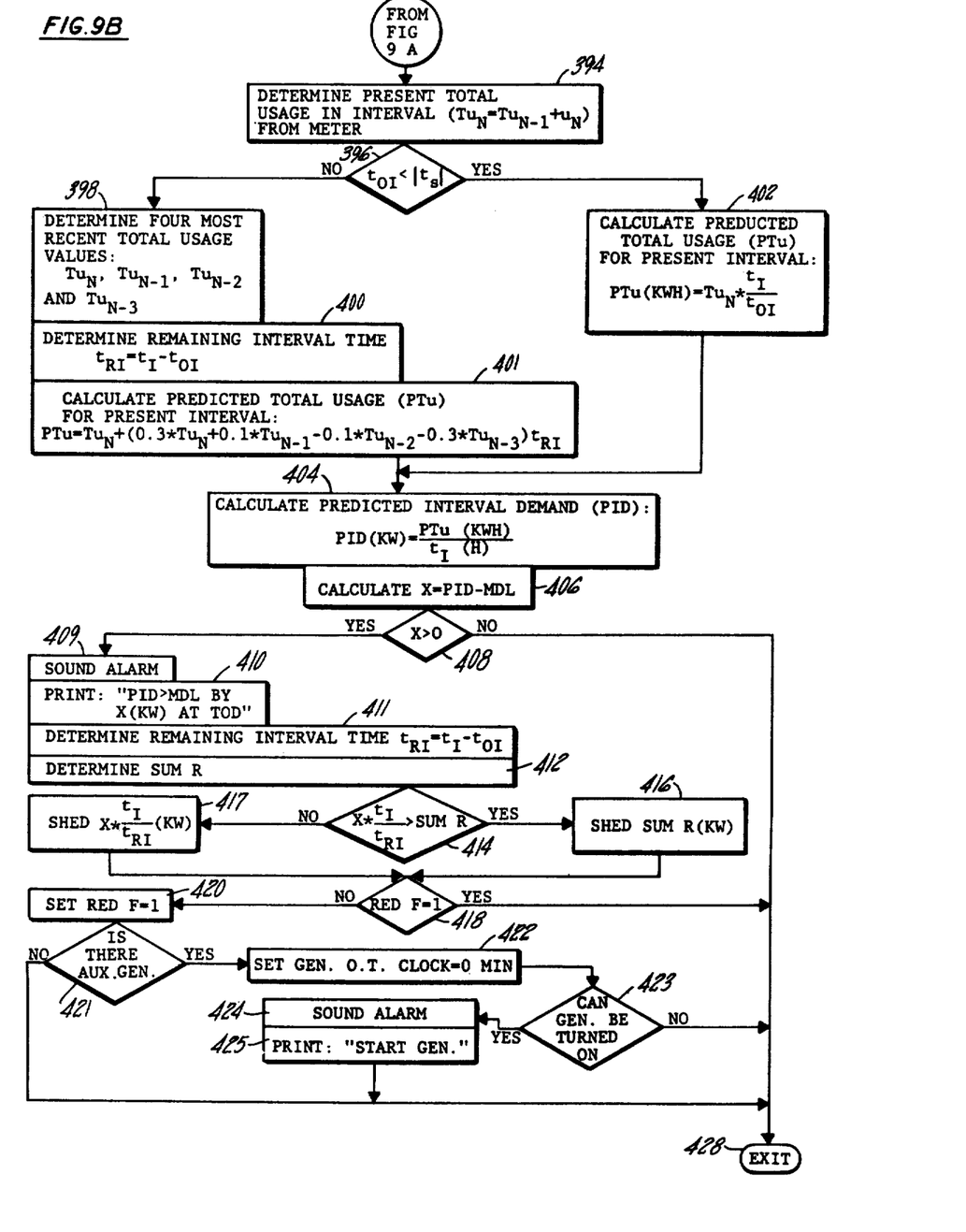

The remote controller 58$_d$ is connected through the trunk line to the HVAC 45 within the building 25. For the purposes of illustrating the variations in environmental conditioning system types, the HVAC 45 is assumed to be of a terminal reheat type system having a dedicated thermal source 46 associated therewith. FIG. 7 illustrates a terminal reheat type of HVAC system known in the art, and the central control of the operation of the terminal reheat system in addition to the interface apparatus is fully disclosed in detail in the hereinbefore referenced, copending application to Bitterli et al which is expressly incorporated by reference into the present application. As shown in FIG. 7, the terminal reheat HVAC includes a cooling coil 150 which conditions air driven in heat exchange relationship therewith by a supply fan 152 from the mixed air damper assemblies of the HVAC. The interface between the remote controller 58$_d$ and the cooling coil, supply fan and mixed air dampers are identical to that described hereinbefore with respect to FIG. 4, and the interface apparatus is similarly identical, i.e. the use of the three-way valves in combination with EP transducers to provide the electrical-to-pneumatic interface between the remote controller and the corresponding control devices within the HVAC. The terminal reheat type HVAC of FIG. 7 differs from the multizone HVAC described hereinbefore with respect to FIG. 4, in that no hot deck is provided, but rather the cool discharge air from the cooling coil 150 is heated prior to discharge into the individual living spaces 154–156 through terminal reheaters 158–160 disposed within the inlet duct to each space. The heaters are presented with a hot fluid flow, such as hot water from a hot source 162 through a pump 164, and the flow to each terminal reheater is controlled through pneumatic valves 166–168 in response to pneumatic temperature error signals provided from associated zone controllers 170–172. As described in the Bitterli et al application, the control of a terminal reheat system is particularly difficult since access to the individual pneumatic valves 166–168 is impractical, however, as described by Bitterli the supervisory control of the terminal reheat function includes interface with the heat source 162 and pump 164. The control function provides selective actuation of each in response to sensed temperature conditions within the living spaces. As shown in FIG. 7, the pump 164 is interfaced through installation of a voltage controlled switch 174, identical to those voltage controlled switches described hereinbefore with respect to FIGS. 4, 5, and 6, which is interconnected between a source of AC voltage 176 and an automatic (A) contact on a manually operable switch 178, and is responsive to gate signals presented to a gate input thereof from the RMP on a line 179. The interconnection between the RMP of the remote controller 58$_d$ and the heat source 162 is provided in an identical manner to that described hereinbefore with respect to the hot source of the PH system of FIG. 6, and the common thermal source 38 of FIG. 5. The remote controller 58$_d$ provides the source 162 with analog signals on a line 180 and discrete signals on a line 182, to control modulation of the source discharge temperature and discrete switching of the on/off state of the source respectively.

Referring again to FIG. 1, as stated hereinbefore the total supervisory control system includes the central control 52 having redundant CPU capability in combination with a plurality of remote controllers, each including an RMP, and each associated with a building in the facility located at some distance from the central control. The RMP in each remote controller provides signal conditioning and analog-to-digital transformation of the analog sensed signals, storage of the sensed signal values in a random access memory (RAM) of the RMP between update intervals, and a readout of a selected one, or all, of the stored parameter values to the central control CPU upon request. The RMP provides front end data processing and interim storage of the sensed parameter values, in addition to providing direct control of the various dampers and valves within the respective HVAC, perimeter heating system, and thermal sources. The RMPs allow for a freeing up of the CPU total overhead time which reduces the actual computer time required to service each of the buildings, thereby allowing the CPU to accommodate a larger number of building than would otherwise be allowed. The CPU performs the outer loop control functions for each of the environmental conditioning systems, while the RMP associated with the particular system provides an inner loop control, i.e. the closed loop control of the valves, dampers, etc. associated with each of the combination of the CPU and RMPs provide a hierarchy control system which permits total dynamic control over the operation of each of the individual environmental conditioning systems within the facility.

Figure 2:
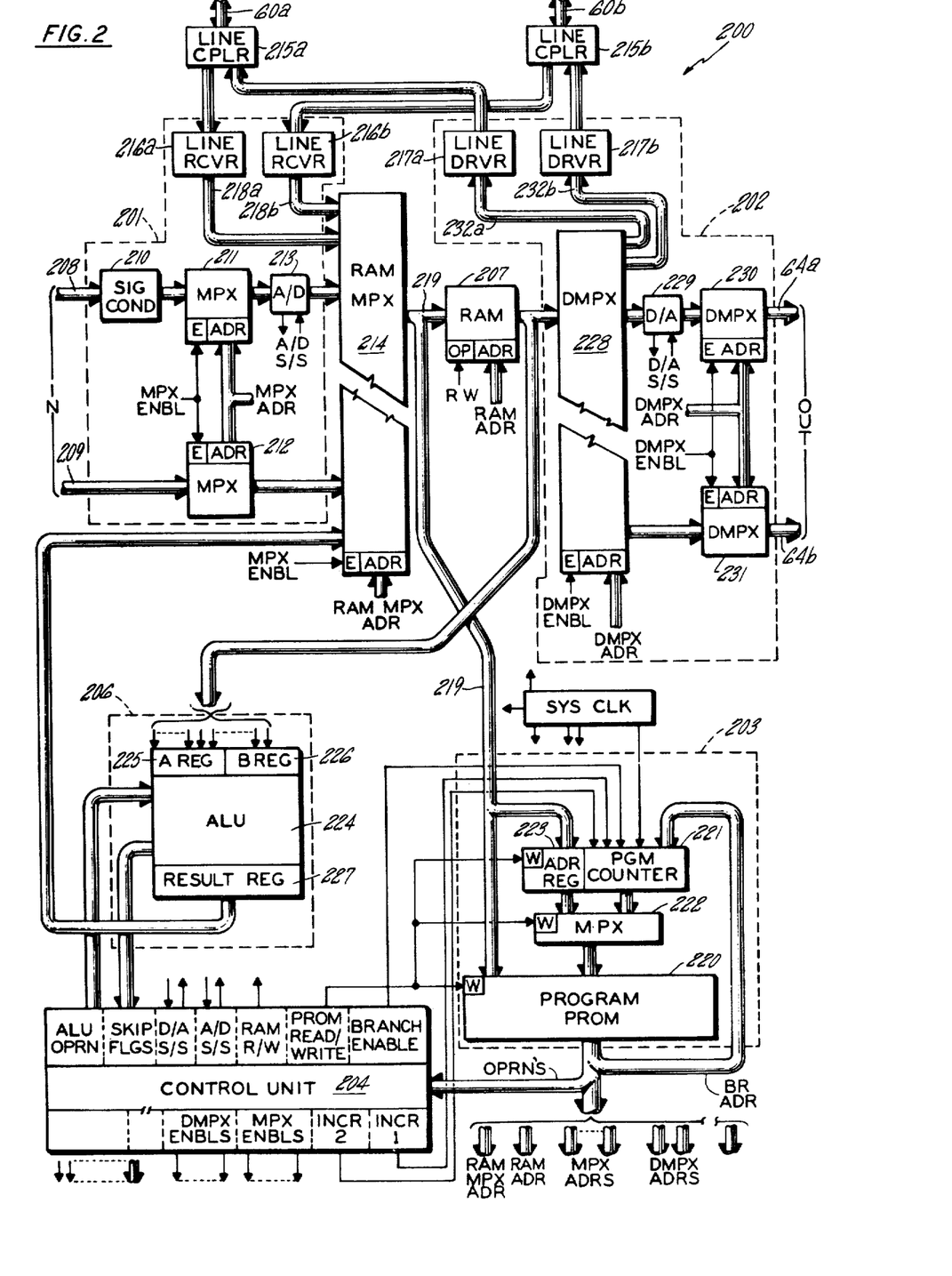
FIG. 2 is a simplified, schematic block diagram illustration of a microprocessing system as may be used with the present invention.

Referring now to FIG. 2, each of the remote controllers 58$_a$–58$_f$ includes an RMP 200 which is illustrated as having the architecture of a typical digital microprocessor system. The RMP is a combination of basic microprocessor elements including: input, output sections 201, 202 for receiving and transmitting data to associated environmental conditioning system (ECS), such as the HVAC and PH systems, and to the CPU 54$_a$, 54$_b$; a main memory section 203 for providing programmed instructions for the RMP through operand address programming; a control unit 204 for providing program control over RMP operation sequencing; an arithmetic unit 206 for providing the operational add, subtract, multiply, and divide functions of the RMP; and a random access memory (RAM) 207 for providing memory storage of the interim and final result outputs from the arithmetic unit 206, and for all signal information from the input section 201, including sensed ECS data and CPU instruction commands.

The input section 201 receives the analog sensed signals from the HVAC and PH systems on the trunk line 208, in addition to any discrete signals from the systems, such as temperature alarm units and pneumatic line ΔP limits, on a line 209. The analog signals on the line 208 are presented through signal conditioners 210 to the input of a multiplexer (MPX) 211 and the discrete signals on lines 209 are presented to the input of an MPX 212, both MPXs being under program control from the programmable memory 203. The output of the MPX 211 is presented to an analog-to-digital (A/D) converter 213 which exchanges start/stop commands with the control unit 204. The output of the A/D 213 and MPX 212 are presented, together with the output of the arithmetic unit 206, to inputs of a RAM MPX 214. The RMP also receives signal information presented from the CPUs $54_a$, $54_b$ on an associated one of the pairs of triaxial trunk lines 60–63, such as the triaxial pair $60_a$, $60_b$, each of which is connected to the RMP through line coupling networks $215_a$, $215_b$. The line coupling networks are of a type known in the art employing standard current loop coupling techniques to provide for transfer of signal information in both directions between the CPUs $54_a$, $54_b$ and the RMP over each of the lines in the pair. Each coupling network $215_a$, $215_b$, is connected to an associated one of two line receivers $216_a$, $216_b$, and two line drivers $217_a$, $217_b$. Signal information from the CPUs $54_a$, $54_b$ presented on either one of the triaxial lines $60_a$, $60_b$ is presented by the receivers $216_a$, $216_b$ through lines $218_a$, $218_b$ to inputs of the RAM MPX 214. The MPX 214 scans each of the input lines under a RAM MPX program address from memory 203 on command of MPX strobes generated by the control unit 204, and presents the information at each input through lines 219 to the RAM 207, which stores it in a memory location defined by the RAM address programming from the main memory. In addition, the output from the MPX 214 on the lines 219 is presented to the input of the main memory 203 to provide, under command of a program subroutine, access by the CPU to the main memory 203 for reprogramming the RMP operational instructions stored in the main memory.

The main memory section 203 includes a programmable read only memory (PROM) 220 normally responsive to the output of a program counter 221 presented through an MPX 222. The PROM 220 may actually comprise a read/write memory so as to be alternatively responsive to CPU interrupt or reprogramming instructions presented on the lines 218 to another input of the PROM 220 and to an address register 223, connected through the MPX 222. The PROM 220 provides operand address programming for the RAM MPX 214, the RAM 207 address, and the program address for the multiplexers and demultiplexers (MPX, DMPX) of the input and output sections 201, 202. In addition the PROM 220 provides the operand addressing to the control unit 204 and the branch address to the program counter 221.

The arithmetic unit 206 includes an arithmetic logic unit (ALU) 224 which performs the selected mathematical function on the data presented from the RAM 207 through the operating A and B registers 225, 226. The result of the ALU operation is presented through a result register 227 to the input of the RAM MPX 214. The ALU operation (add, subtract, multiply, or divide) is selected by the control unit 204, and the RAM operand address, which controls the data presented to the ALU from the RAM, is provided from the PROM. As may be required, SKIP FLAGS are generated by the ALU and presented to the control unit to provide PROM skip instructions as may be necessary during the particular mathematical operation being performed. The result data stored in the RAM 207 is presented to the CPU and to the associated ECS (on CPU request or PROM 220 program command) through a demultiplexer (DMPX) 228 which, under program control from the PROM 220 presents the ECS analog signals, i.e. the input signals to the EP transducers of FIGS. 4, 6, 7, through a digital-to-analog converter (D/A) 229 and DMPX 230 to lines within an associated one of the interconnecting trunk lines (64–69 of FIG. 1), such as $64_a$ of lines 64, the ECS discrete signals through a DMPX 231 to lines $64_b$ within the trunk line 64, and the data output to the CPU through lines $232_a$, $232_b$ to line drivers $217_a$, $217_b$. Both DMPXs 230, 231 are under program control from the PROM 220 and the D/A 229 exchanges start/stop strobes with the control unit 204.

In operation, as known to those skilled in the art, the MPX 214 reads all of the input data to the RMP 200 into the RAM 207 where it is stored at address locations determined by a RAM address program from PROM 220. The PROM scans and identifies all data entries to the RAM, both sensed ECS parameter information and inputs from the CPU, by ordering both stored data and stored control character code information from the RAM 207 into the A and B registers 225, 226 of the arithmetic unit 206. A PROM program subroutine then sequentially compares identifying characters contained within selected bytes of the information word with each of a plurality of identifying characters within the character code until the information word is identified. Depending upon the identification of the information word, the program may branch to various addresses as determined from the PROM 220 and the word may be returned to the same location in RAM or changed to a different address location. This may be accomplished through SKIP FLAGS dependent on results in the ALU 224 and presented to the control unit 204. A SKIP FLAG causes the program counter to increment two steps, such as to bypass a branch instruction; no SKIP FLAG causes an increment of one, allowing execution of the next sequential instruction (operational or branch). Use of various branch instructions enables the program to unconditionally branch to an address stored in PROM 220, to call up various subroutines as required for the program operation during normal running of the RMP.

The RMP includes a subroutine for identifying CPU program change instructions, wherein a first word from the CPU is presented through the MPX 214 into a RAM 207 memory location determined by the address program. The word is identified by the normal PROM scanning of the stored RAM data through the subroutine described hereinbefore. When identified as a CPU instruction, a PROM write strobe from the control unit 204 is presented to the address register 223 allowing entry into the register of the next word from the CPU appearing on the line 219 and containing the desired address location in PROM 220 of the new CPU instruction. A third word from the CPU, containing the instruction change information, is presented from the lines 219 to the input of the PROM 220 simultaneously with the presentation of a second PROM write strobe from the control unit 204 to the MPX 222 which allows the PROM 220 to read the address location stored in the register 223 together with the instruction word appearing at the input on the line 219. In this manner operating program instructions stored in the PROM 220 may be altered by CPU command. Similarly the values of operating constants for the inner loop control of the ECS, which are stored in the RAM 207, may similarly be changed on CPU instruction which orders the PROM 220 to pull out the appropriate constant stored in the RAM 207 and read in the new value of the constant from the CPU.

The RMP 200 is free running, i.e. asynchronous with the CPU, and scans the sensed analog and discrete input signals from the input section 201 at a rate typically ten times greater than that required by the CPU, i.e. typically the CPU receives data from the RMP every 10 seconds, and the RMP scans all of the data input lines and closes each of the proportional gain inner control loops every one second. The normal free running scan of the sensed parameters is interrupted for communication with the CPU, for both program change commands and commands for data readout from the RAM 207. The interrupt time represents approximately 5% of the total RMP running time. The CPU also interrupts the RMP to provide loading of CPU calculated temperature reference values into the RAM 207, to command the RMP 200 to provide comparison of the duct reference temperature with the stored sensed temperature values, and to generate the resultant error control signal to the appropriate valves and damper actuators within the HVAC and PH systems. The control procedures for the RMP 200 is stored in the PROM 220 while the RAM stores both the sensed data and control character code subroutine information, in addition to providing scratch pad storage for the arithmetic unit 206. Similarly, specific data acquisition software, i.e. unique configuration tables for a specific control loop is loaded from the CPU and is stored in the RAM. Memory capacity for the RMP is typically 2K words of PROM and 4K words of RAM. In addition to providing the data acquisition from the HVAC system sensors and proportional inner loop control of the ECS controlled devices, i.e. valves, dampers, the RMP also provides a program shutdown routine stored in the PROM 220 for relinquishing control from the CPU to the existing ECS controller, i.e. the HVAC and PH systems site control loops. It should be understood that the RMP of FIG. 2 is illustrative of one configuration of a dedicated microprocessor system suitable for providing the data acquisition and front end processing of data for the CPU, and the specific architecture is dependent on a given particular implementation of the present invention and forms no part of this invention. Similarly, any suitable general purpose microprocessor known in the art and having the requisite characteristics, such as the industry standard model 8080A, may be used if desired with standard programming techniques.

Figure 3:
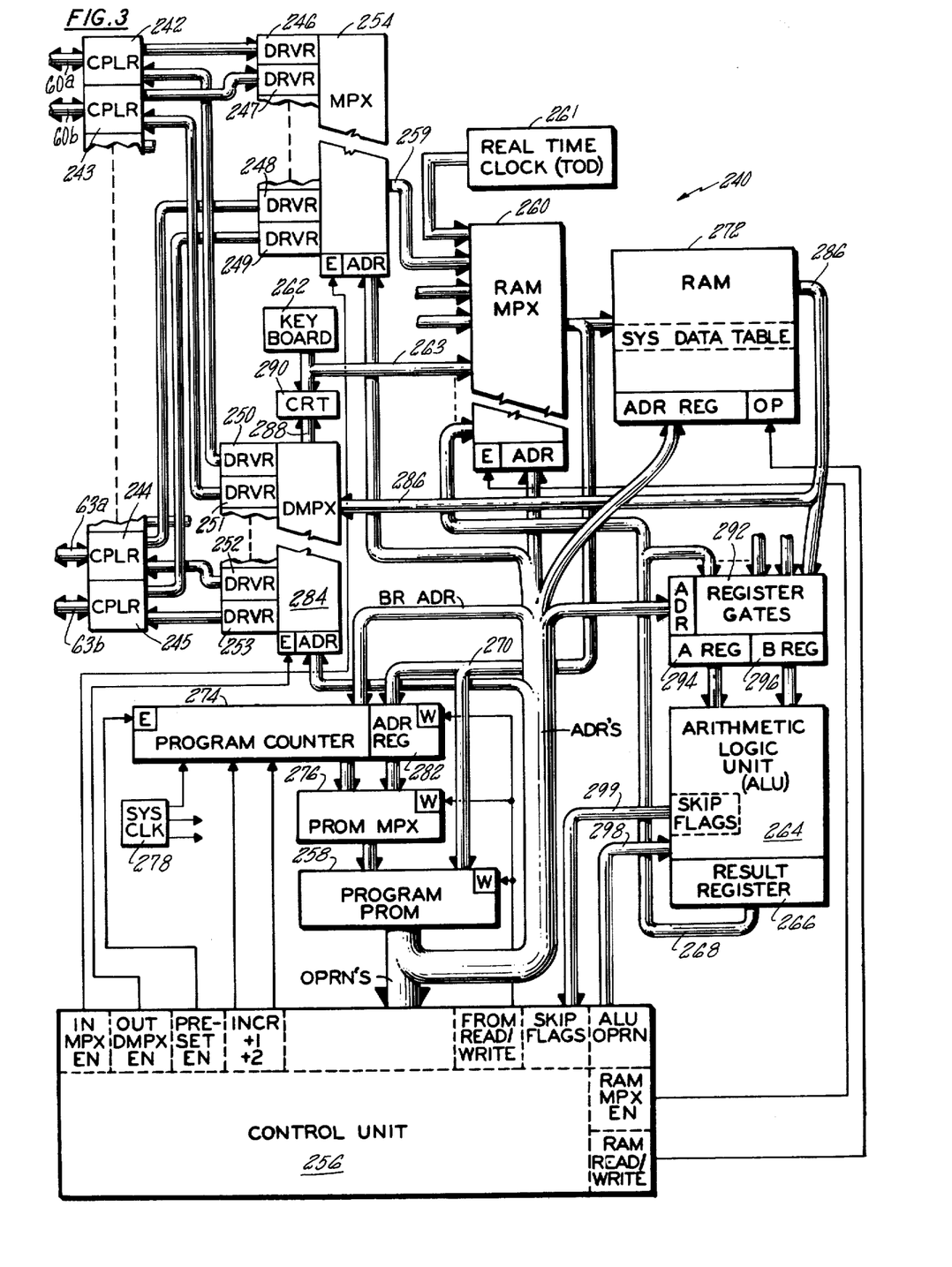
FIG. 3 is a simplified, schematic block diagram illustration of a real time digital processing system as may be used with the control system of the present invention.

Referring now to FIG. 3, a CPU which may incorporate the central control function of the present invention provided by CPUs $54_a$, $54_b$ is illustrated as representing the architecture of a typical, real time data processing system 240. Each of the triaxial lines (a, b) in each of the pairs of lines 60–63 of FIG. 1 from each of the remote controller RMPs, such as the RMP 200 of FIG. 2, are presented through line coupling networks identical to the couplers $215_a$, $215_b$ of FIG. 2, as illustrated by the lines $60_a$, $60_b$ connected to coupling networks 242–245. Each of the coupling networks 242–245 are connected to an associated one of line receivers 246–249, and line drivers 250–253. The output of each of the receivers 246–249 is connected to a corresponding one of a plurality of inputs of an MPX 254 which, when enabled by a strobe from a control unit 256, sequentially scans the input lines under address program control of a programmable read only memory (PROM) 258. Each of the input data signals are presented in turn through lines 259 to one input of a RAM MPX 260 which scans a plurality of RAM input data lines including: the output from a real time clock 261 which provides the time of day (TOD) with a timekeeping capability ranging from seconds to years, the output of a keyboard 262 presented through lines 263, and the output of an arithmetic logic unit (ALU) 264 presented through a result register 266 and a set of lines 268. The RAM MPX 260 scans each of the input lines when enabled by a strobe from the control unit 256 under address control from the PROM 258, and presents the selected input data lines through a set of lines 270 to the input of a RAM 272 and to a write input of the PROM 258. The RAM 272 is similarly under an address program control from the PROM 258 and receives an operational code strobe (RAM READ/WRITE) from the control unit 256.

The control unit 256 responds to command inputs from the PROM 258 which in turn is under control of a program counter 274 presented through a PROM MPX 276. The program counter 274 receives the output of a system clock 278 which provides the CPU operating time base. The program counter 274 is also responsive to pre-set enable, and increment one, and increment two strobes from the control 256. The PROM MPX 276 is responsive to read/write control signals from the control unit 256 to present either the output of the program counter 274, or alternatively the output of an address register 282 to the input of the PROM 258. The address register 282 receives the output of the RAM MPX 260 on the lines 270 and is used in conjunction with a subroutine similar to that described hereinbefore with respect to the RMP 200 of FIG. 2, to provide reprogramming of the PROM 258 through keyboard 262 entry by a maintenance operator.

In addition to providing the address programming for the MPXs 254, 260 and the RAM 272, the PROM 258 also provides operational address programming for a demultiplexer (DMPX) 284 which presents the output from the RAM 272 on lines 286 to a plurality of output lines including lines 288 to a video display (CRT) 290, which provides visual display of input information presented through the keyboard 262 by the operator and output data presented to the RMP from the CPU, and through lines to each of the line drivers 250-253. The PROM 258 also provides the branch address to the program counter 274 and program address information to address register gates 292 which control the data flow into and A and B registers 294, 296 of the ALU 264.

The stored program within the PROM 258 is implemented through the control unit 256 which provides enabling strobes for the CPU muliplexers and demultiplexers in addition to providing operative read/write instructions to the RAM 272 and operation instructions (arithmetic, logic, compare, etc.) to the arithmetic unit 264 on lines 298. The control unit 256 receives instruction inputs to alter the PROM sequency from SKIP FLAGS generated in the ALU 264 and presented on the lines 299.

The real time data processing system of FIG. 3 represents one configuration of a dedicated hardware, real time data processing apparatus which may be advantageous for use in implementing the control system of the present invention where general purpose programming is neither required nor practical in view of the control functions to be performed. It should be understood, however, that the specific architecture is dependent on the particular implementation of the present invention, and forms no part of the present invention. If it is deemed necessary, or practical, any one of a number of well known processing systems may be used as may be obvious, or readily apparent, to those skilled in the art. As is more apparent in the light of detailed operational descriptions provided hereinafter, well known processing systems such as the Digital Equipment Corporation Model PDP 1135 or 1140 general purpose computers used in combination with real time operating software such as the Digital Equipment Corporation RSX-11M real time software system, employing only programs provided through programming techniques well known in the art, may be utilized in conjunction with the remote microprocessor and the HVAC sensors and interface control equipment described hereinbefore.

The central supervisory control of the present invention provides total operational control of the entire network of environmental conditioning systems within a facility comprising some number of buildings each located at some distance from each other, and from the central control location. The system includes the use of a central CPU in combination with a RMP associated with each of the groups of environmental conditioning systems to be controlled, thereby providing a hierarchial control function. This hierarchy in control allows for the most efficient optimization of environmental conditioning system performance in an attempt to achieve the optimum energy savings. The operating temperature limits and individual reference values for each of the various systems within the facility may be adjusted independently to satisfy local conditions within a given building, or jointly to attempt an energy savings. Similarly, the total operation of the HVAC and perimeter heating systems may be adjusted on a facility wide basis, rather on a single building basis as in present prior art systems. The use of the CPU for outer loop control allows for control loops in individual HVAC systems which include a combination of both proportional and integral gain as described in the hereinbefore referenced application to Games et al (Ser. No. 829,379), which allows for energy conservative control of the individual HVAC outputs.

Although the invention has been shown and described with respect to exemplary embodiments thereof, in connection with circuitry to be used therewith in a variety of exemplary applications, it should be understood by those skilled in the art that the invention may be practiced in a wide variety of configurations and utilizations, some of which are described hereinbefore, and that the foregoing and various other changes, omissions and additions may be made in and to the invention without departing from the spirit and the scope thereof.

Having thus described a detailed embodiment of our invention, that which we claim as new and desire to secure by Letters Patent of the United States is:

1. Apparatus for controlling the operation of an environmental conditioning system (ECS) of the type which regulates environmental conditions of a space in dependence on the actual value of output parameters provided by one or more controlled devices therein in response to corresponding parameter control signals presented to each, comprising:

plurality of sensor means disposed in the ECS, one or more associated with each controlled device for providing sensed actual value output parameter signals from the associated controlled device;

plurality of control interface means, one associated with each controlled device, each adapted for providing in response to closed loop signals presented thereto the corresponding parameter control signal to the associated controlled device;

remote processor unit (RPU) means, having RPU input means and RPU output means and having RPU memory means for storing signals, said remote processor unit means being responsive at said RPU input means to said sensed actual value parameter signals presented thereto from said plurality of sensor means and to controlled device reference parameter signals for each controlled device presented thereto from a central processor unit means, said RPU input means having means for successively sampling, and registering in said RPU memory means, successively sampled values of said sensed actual value parameter signals and said controlled device reference parameter signals presented thereto, said RPU output means being connected to each of said control interface means, said remote processor unit means comparing said sensed actual value parameter signals registered therein for each controlled device with the controlled device reference parameter signal registered therein for the same controlled device for providing through said RPU output means to the associated one of said control interface means said closed loop signal at a magnitude in dependence on a difference value therebetween; and central processor unit (CPU) means, having CPU input means connected for response to said RPU output means and CPU output means connected for response to said RPU input means, and having CPU memory means for storing signals including a plurality of ECS reference signals for the ECS, said CPU input means having means for sampling, and registering in said CPU memory means, signals presented thereto including said sensed data signals registered in said RPU memory means which are presented to said CPU input means in response to command signals provided by said central processor means to said remote processor means, said central processor means comparing said sensed actual value parameter signals for each controlled device with one or more of said plurality of ECS reference signals for providing said controlled device reference parameter signals to said remote processor means at a magnitude equal to a difference value therebetween.

2. The apparatus of claim 1, further comprising means responsive to operator control for providing to said CPU input means, signal information representative of said plurality of ECS reference signals in response to selective operation thereof.

3. Apparatus for controlling the operation of a plurality of environmental conditioning systems (ECSs) each of which regulate environmental conditions of a space in dependence on the actual value of output parameters provided by one or more controlled devices therein in response to corresponding parameter control signals presented to each, comprising:

plurality of sensor means disposed in each ECS, one or more sensor means in each plurality being associated with each controlled device in the related ECS, said sensor means each adapted to provide sensed actual value output parameter signals from the associated controlled device;

plurality of control interface means, one associated with each controlled device in each ECS, each adapted for providing in response to closed loop signals presented thereto the corresponding parameter control signal to the associated controlled device;

remote processor unit (RPU) means for each ECS, each having RPU input means and RPU output means and each having RPU memory means for storing signals, said remote processor unit means each responsive to said RPU input means to said sensed actual value parameter signals presented thereto from said plurality of sensor means disposed in the related ECS and to controlled device reference parameter signals for each controlled device in the related ECS presented thereto from a central processor unit means, said RPU input means having means for succesively sampling, and registering in said RPU memory means, successively sampled values of said sensed actual value parameter signals and said controlled device reference parameter signals presented thereto, said RPU output means of each of said remote processor unit means being connected to each of said control interface means associated with the controlled devices of the related ECS, each of said remote processor unit means comparing said sensed actual value parameter signals registered therein for each controlled device with the controlled device reference parameter signal registered therein for the same controlled device for providing through said RPU output means to the associated one of said control interface means said closed loop signal at a magnitude in dependence on a difference value therebetween; and central processor unit (CPU) means, having CPU input means connected for response to said RPU output means of each of said remote processor means and CPU output means connected for response to said RPU input means of each of said remote processor means, and having CPU memory means for storing signals including a plurality of ECS reference signals for each ECS, said CPU input means having means for sampling, and registering in said CPU memory means, signals presented thereto including said sensed data signals registered in said RPU memory means of each of said remote processor means which are presented to said CPU input means in response to command signals provided by said central processor means to each of said remote processor means, said central processor means comparing said sensed actual value parameter signals for each controlled device in a related one of the ECSs with one or more of said plurality of ECS reference signals for the same ECS, for providing said controlled device reference parameter signals to said remote processor means associated with the particular ECS at a magnitude equal to a difference value therebetween.

4. The apparatus of claim 3, further comprising means responsive to operator control for providing to said CPU input means, signal information representative of said plurality of ECS reference signals for each ECS in response to selective operation thereof.

* * * * *